July 16, 1929. J. JAROSZ 1,720,839
DOUGH CUTTER
Filed Oct. 19, 1928
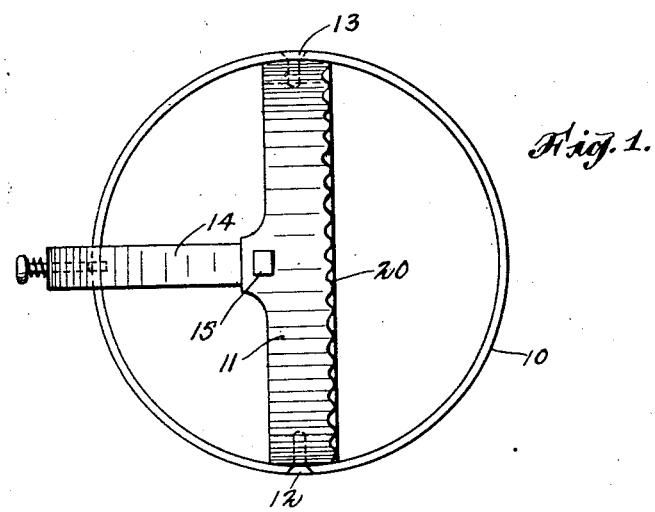
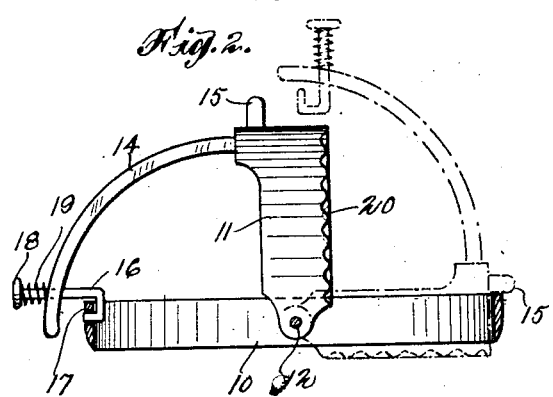
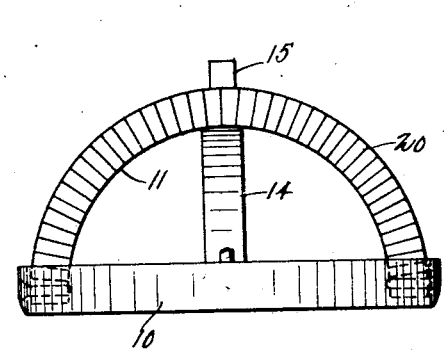
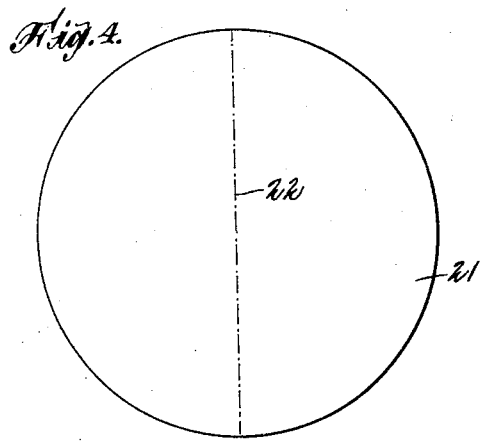
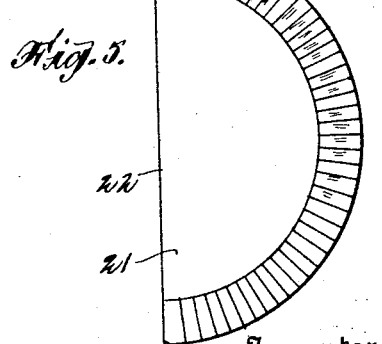
Inventor
John Jarosz Patented July 16, 1929.

1,720,839

UNITED STATES PATENT OFFICE.

JOHN JAROSZ, OF CENTRAL FALLS, RHODE ISLAND, ASSIGNOR OF ONE-HALF TO FRANK J. BOBOLA, OF CENTRAL FALLS, RHODE ISLAND.

DOUGH CUTTER.

Application filed October 19, 1928. Serial No. 313,524.

This invention relates to improvements in dough cutting and marking implements, and it is the principal object of my invention to provide an implement of this character which in one position is used to cut the dough and in its other position is used to mark the same.

Another object of my invention is the provision of a dough cutter and marker equipped with suitable means for locking the implement in its dough cutting position.

A further object of my invention is the provision of a dough cutter and marker equipped with a suitable handle facilitating the use of the implement when used either as cutter or marker.

A still further object of my invention is the provision of a dough cutter and marker of simple and therefore inexpensive construction, yet durable and efficient in its operation.

These and other objects and advantages of my invention will become more fully known, as the description thereof proceeds, and will then be specifically defined in the appended claims.

In the accompanying drawing forming a material part of this disclosure:

Fig. 1 is a top plan view of an implement or dough cutter and marker constructed according to my invention.

Fig. 2 is a side elevation thereof, illustrating in dotted lines the position of the parts when the implement is used for marking a piece of dough.

Fig. 3 is an end view of the element.

Fig. 4 shows a piece of dough cut out with my novel and improved cutter, flattened adapted to be folded along its median diameter.

Fig. 5 is a plan view of the dough, Figure 4 folded upon itself as marked.

As illustrated, my novel and improved dough cutter comprises a ring-shaped member 10 of wood, metal or any other suitable material. Within the circle formed by member 10 a bow-shaped semi-circular element 11 is pivotally attached at its ends, as, at 12 and 13 respectively by means of screws or similar fastening means.

At the center of the bow, a curved handle 14 is attached by means of a peg 15 or the like projecting beyond the plan of the bow for a purpose hereafter more fully to be described. The outer end of the curved handle can be locked in the position of the same illustrated in Figure 2 to the ring or hoop-member 10 by means of a hook 16 or the like, the bent rear end of which is passed through an opening 17 in the ring wall, while its shaft extends through the end of handle 14 and carries at its extreme outer end a knob 18 or the like, while a spring 19 is wound about the shaft of the hook 16 between knob 18 and the outer face of the handle.

The outer face of the bow-shaped element 11 is corrugated, as at 20.

In operation a circular piece 21 is cut out of the dough by means of the ring-shaped member 10 which for this purpose is gripped by handle 14 when the same is in its locked position illustrated in Figure 2, and the filling, a jelly or the like is placed on the disc of dough, whereafter the same is folded upon itself along its central diameter 22. Now the handle is unlocked and the bow-shaped element 11 is turned by means of the handle 14 about its pivot point 12, 13 in order to bring the corrugated face 20 under a certain pressure upon the peripheral margin of the dough to close the pouch thus formed over the filling and to mark the outer face of the margin accordingly, it will be clear that the face 20 can also be provided with any kind of allegoric figures or the like in place of the corrugations.

The downward movement of the element 11 thereby is limited by the peg 15 projecting beyond the face of the element 11 and adapted to engage the upper edge of the ring-shaped member 10, as indicated in dotted lines in Figure 2 which also illustrates the position of the handle during the marking operation of the implement.

It will be understood that I have shown and described the preferred form of my implement as one example of the many ways in which the same may be practically constructed, and that I may make such changes in its general arrangement and in the construction of its minor details as come within the scope of the appended claims without departure from the spirit of my invention as disclosed.

Having thus described my invention, what I claim as new and desire to secure by Letters Patent is:

1. A dough cutting and marking implement comprising a circular member adapted to cut circular pieces from a flattened dough, a marker attached to said circular member, a common handle for said member and said marker attached at its end to said marker, means for locking said handle during the operation of said circular member as a cutter, and a means for limiting the downward movement of said marker.

2. A dough cutting and marking implement comprising a means for cutting or stamping circular pieces from a flattened dough, a marker pivotally attached to said cutting means, a common handle for both, a corrugated outer face on said marker, a means for locking said handle to said cutting means during the operation of the implement, as a cutter, and allowing when unlocked a turning of said marker about its pivots for bringing its corrugated face against the outer margin of the dough, previously filled and folded upon itself, and a means for limiting the downward movement of said marker.

3. A dough cutting and marking implement comprising an open ring-shaped member having a perforation in its periphery, and adapted to be pressed into a flattened piece of dough to cut a circular disc therefrom adapted to be provided with a filler and folded over the same upon itself along its medium diameter to form a pouch, a substantially semi-circular bow-shaped element pivoted at its ends within the ring-shaped member, a curved and perforated handle, a peg for securing one end of said handle to said element in its center, said peg projecting beyond the plane of said element, a hook-shaped locking member adapted to engage with its hook end in the perforation of said circular member and passing with its shaft through the perforation of said handle near its outer end, a knob on said locking member, a spring wound about said shaft between said knob and said handle, the outer face of said bow-shaped element corrugated and adapted to be pressed upon the outer margin of the dough pouch to close and mark the same upon the depression of said bow-shaped element by said handle upon its release by said locking member, said peg limiting the downward movement of said corrugated face of the bow shaped marker.

Signed at Central Falls, in the county of Providence and State of Rhode Island this 4th day of October A. D. 1928.

JOHN JAROSZ.